(12) United States Patent
Miura et al.

(10) Patent No.: US 9,030,805 B2
(45) Date of Patent: May 12, 2015

(54) CAPACITOR AND CAPACITOR MODULE USING THE SAME

(71) Applicant: Panasonic Corporation, Osaka (JP)

(72) Inventors: Teruhisa Miura, Kyoto (JP); Hideki Shimamoto, Kyoto (JP); Shusaku Kawasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 140 days.

(21) Appl. No.: 13/798,655

(22) Filed: Mar. 13, 2013

(65) Prior Publication Data

US 2013/0258553 A1 Oct. 3, 2013

(30) Foreign Application Priority Data

Mar. 28, 2012 (JP) ................................ 2012-073207

(51) Int. Cl.
| | |
|---|---|
| *H01G 11/28* | (2013.01) |
| *H01G 11/70* | (2013.01) |
| *H01G 9/008* | (2006.01) |
| *H01G 11/74* | (2013.01) |
| *H01G 11/10* | (2013.01) |
| *H01G 11/76* | (2013.01) |
| *H01G 11/82* | (2013.01) |

(52) U.S. Cl.
CPC .............. *H01G 11/28* (2013.01); *H01G 11/10* (2013.01); *H01G 11/70* (2013.01); *H01G 11/74* (2013.01); *H01G 11/76* (2013.01); *H01G 11/82* (2013.01); *Y02T 10/7022* (2013.01); *Y02E 60/13* (2013.01)

(58) Field of Classification Search
CPC ........ H01G 11/28; H01G 11/70; H01G 11/74
USPC ................... 361/503, 511, 515, 520
See application file for complete search history.

(56) References Cited

U.S. PATENT DOCUMENTS

| | | | |
|---|---|---|---|
| 3,593,066 A * | 7/1971 | Norman, Sr. ................ | 361/522 |
| 5,849,431 A * | 12/1998 | Kita et al. .................. | 429/164 |
| 6,071,638 A * | 6/2000 | Fradin ......................... | 429/94 |
| 6,137,673 A * | 10/2000 | Andou et al. ............... | 361/502 |
| 6,310,756 B1 * | 10/2001 | Miura et al. ............... | 361/301.3 |
| 7,763,377 B2 | 7/2010 | Kozuki | |
| 8,045,320 B2 * | 10/2011 | Hibi et al. .................. | 361/502 |
| 8,233,267 B2 * | 7/2012 | Miura et al. ............... | 361/511 |
| 8,390,986 B2 * | 3/2013 | Oh et al. .................... | 361/502 |
| 8,958,199 B2 * | 2/2015 | Kobayashi et al. ......... | 361/517 |
| 2002/0106553 A1 * | 8/2002 | Nemoto et al. ............. | 429/52 |

(Continued)

FOREIGN PATENT DOCUMENTS

| | | |
|---|---|---|
| JP | 08-083738 | 3/1996 |
| JP | 10-270293 | 10/1998 |

(Continued)

*Primary Examiner* — Jeremy C Norris
*Assistant Examiner* — Nathan Milakovich
(74) *Attorney, Agent, or Firm* — Wenderoth, Lind & Ponack, L.L.P.

(57) ABSTRACT

Two electrodes are drawn out from a wound capacitor element by a pair of leads. Each of electrodes forming the capacitor element includes a sheet-like collector, an electrode layer formed on the surface of the collector, and an exposed part provided on one edge of the collector. The electrode layer is not formed on the exposed part. The electrodes are wound such that the exposed parts come to both ends of the capacitor element. Two or more points of at least one of the exposed parts are connected together.

11 Claims, 18 Drawing Sheets

(56) References Cited

U.S. PATENT DOCUMENTS

| | | | |
|---|---|---|---|
| 2003/0118912 A1* | 6/2003 | Watanabe et al. | 429/326 |
| 2005/0058908 A1* | 3/2005 | Imachi et al. | 429/233 |
| 2009/0015987 A1* | 1/2009 | Miura et al. | 361/502 |
| 2010/0124694 A1* | 5/2010 | Hikata et al. | 429/94 |
| 2010/0316897 A1* | 12/2010 | Kozuki et al. | 429/94 |
| 2011/0151295 A1* | 6/2011 | Kim | 429/94 |
| 2011/0223455 A1* | 9/2011 | Kimura et al. | 429/94 |
| 2012/0052354 A1* | 3/2012 | Hattori et al. | 429/94 |
| 2012/0100407 A1* | 4/2012 | Inoue et al. | 429/94 |
| 2012/0248076 A1* | 10/2012 | Hosokawa et al. | 219/121.64 |
| 2013/0048340 A1* | 2/2013 | Bando et al. | 174/126.2 |
| 2013/0052499 A1* | 2/2013 | Hasegawa et al. | 429/94 |
| 2013/0155575 A1* | 6/2013 | Mori et al. | 361/500 |
| 2013/0163147 A1* | 6/2013 | Uehara et al. | 361/502 |
| 2013/0209849 A1* | 8/2013 | Hattori et al. | 429/94 |
| 2013/0224546 A1* | 8/2013 | Hama et al. | 429/94 |
| 2014/0113185 A1* | 4/2014 | Mori et al. | 429/179 |
| 2014/0293511 A1* | 10/2014 | Mori et al. | 361/502 |

FOREIGN PATENT DOCUMENTS

| | | |
|---|---|---|
| JP | 2005-353519 | 12/2005 |
| JP | 2010287703 A * | 12/2010 |

* cited by examiner

FIG. 6

| Sample | Shape of electrode machined part | Development view of positive electrode | Resistance |
|---|---|---|---|
| A | | | 2.76mΩ |
| B | | | 2.89mΩ |
| C | | | 3.10mΩ |
| D | | | 13.41mΩ |

CAPACITOR AND CAPACITOR MODULE USING THE SAME

BACKGROUND

1. Technical Field

The present technical field relates to capacitors and capacitor modules using the same both used typically for electronic devices, regeneration of hybrid vehicles or power storage.

2. Background Art

FIG. 21 is a partly cutaway perspective view showing a structure of a conventional capacitor. This capacitor includes capacitor element 101, electrolyte (not illustrated), rubber sealing member 108, and bottomed cylindrical metal case 107.

Element 101 is configured by winding positive electrode 102 and negative electrode 103 with separator 104 therebetween. Positive electrode 102 has collector 102A formed of aluminum foil and polarized electrode layer 102B formed on both faces of collector 102A. In the same way, negative electrode 103 includes collector 103A formed of aluminum foil and polarized electrode layer 103B formed on both faces of collector 103A. Positive electrode 102 and negative electrode 103 are connected to leads 105 and 106, respectively. Leads 105 and 106 are connected to portions where collectors 102A and 103A are exposed by partially removing polarized electrode layers 102B and 103B.

After impregnating electrolyte to capacitor element 101, capacitor element 101 is inserted into case 107. Leads 105 and 106 led out from capacitor element 101 are passed through through-holes provided in sealing member 108. Sealing member 108 is fitted into an opening of case 107. Then, an outer periphery around the opening of case 107 is drawn inward. An open end of case 107 is further curled. Sealing member 108 is compressed through these processes, and thus the inside of case 107 is sealed.

SUMMARY

A capacitor in the following exemplary embodiments includes a capacitor element, an electrolyte with which the capacitor element is impregnated, and an exterior housing. The capacitor element includes a first electrode, a second electrode facing the first electrode, and a separator. The first electrode includes a sheet-like first collector, a first electrode layer formed on a surface of the first collector, and a first lead connected to the first collector. The second electrode includes a sheet-like second collector, a second electrode layer formed on a surface of the second collector, and a second lead connected to the second collector. The separator is provided between the first electrode and the second electrode. The first electrode, second electrode, and separator are wound around a winding axis. The capacitor element has a first end and a second end on an opposite side of the first end along the winding axis. The exterior housing accommodates the capacitor element and the electrolyte, and allows a part of the first and second leads to pass therethrough to the outside. The first collector has an exposed part exposed from the first electrode layer at the first end, or the second collector has a second exposed part exposed from the second electrode layer at the second end. At least one of two cases is satisfied. In a case that the first collector has the first exposed part, two or more points of the first exposed part are electrically connected. In a case that the second collector has the second exposed part, two or more points of the second exposed part are electrically connected.

A capacitor module includes multiple capacitors with the above structure and a connector connecting them.

BRIEF DESCRIPTION OF THE DRAWINGS

FIG. 6 shows results of simulating changes in resistance by the size of an electrode machined part provided in the capacitor element in the first exemplary embodiment.

DETAILED DESCRIPTION OF PREFERRED EMBODIMENTS

Figure 21:
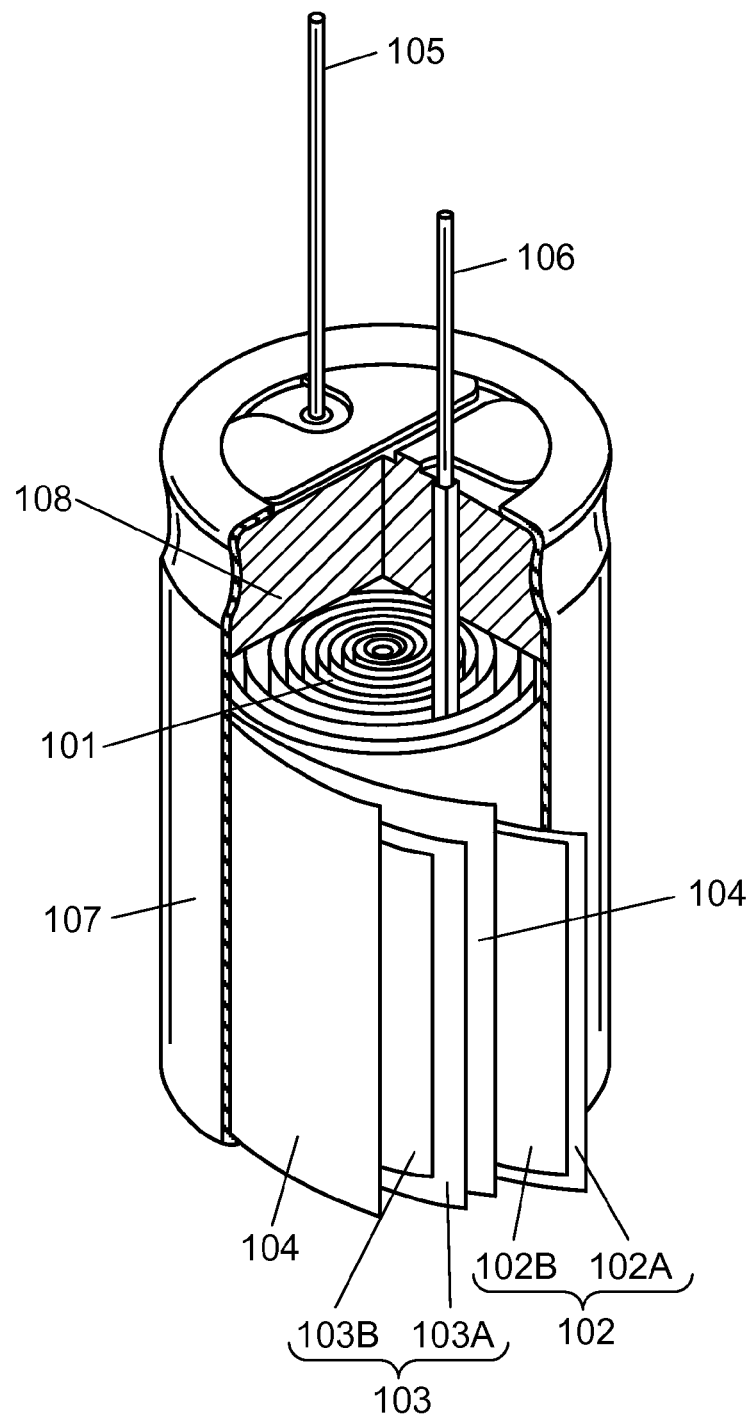
FIG. 21 is a partly cutaway perspective view of a conventional capacitor.

In a conventional capacitor shown in FIG. 21, polarized electrode layers 102B and 103B are partially removed to partially expose collectors 102A and 103A, and these exposed portions are connected to leads 105 and 106, respectively. This reduces resistance. However, only leads 105 and 106 are portions electrically connected to outside in wound capacitor element 101. Therefore, resistance is basically large. In addition, since resistance is large, an amount of heat generated by charge and discharge inside the capacitor becomes large. This heat may accelerate degradation of characteristics of the capacitor.

First to fourth exemplary embodiments are described below with reference to drawings hereinafter. It is apparent that the exemplary embodiments below do not limit the scope of the present invention. Components the same as those in a previous embodiment are given the same reference marks to omit duplicate description.

First Exemplary Embodiment

Figure 1A:
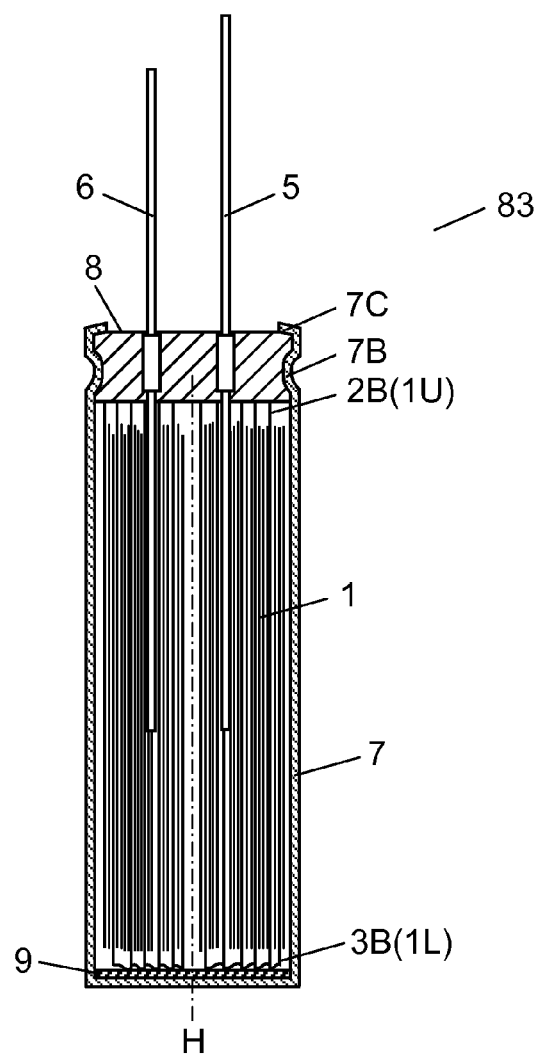
FIG. 1A is a front sectional view of a capacitor in accordance with a first exemplary embodiment.
Figure 1B:
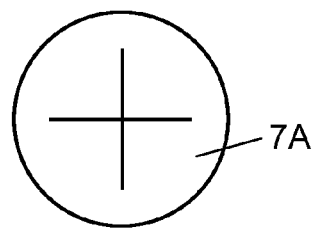
FIG. 1B is a bottom view of the capacitor shown in FIG. 1A.
Figure 2A:
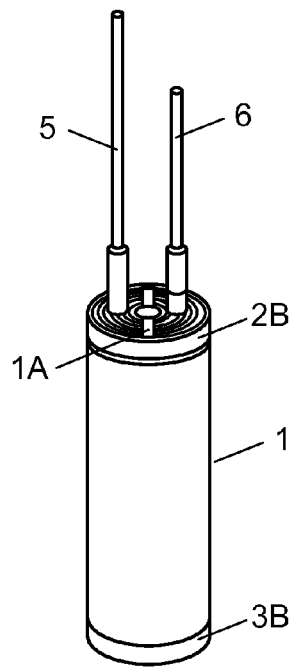
FIG. 2A is a perspective view seen from the top of a capacitor element in the capacitor shown in FIG. 1A.
Figure 2B:
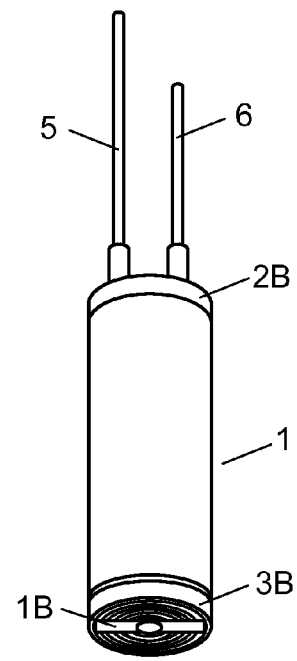
FIG. 2B is a perspective view seen from the bottom of the capacitor element shown in FIG. 2A.
Figure 2C:
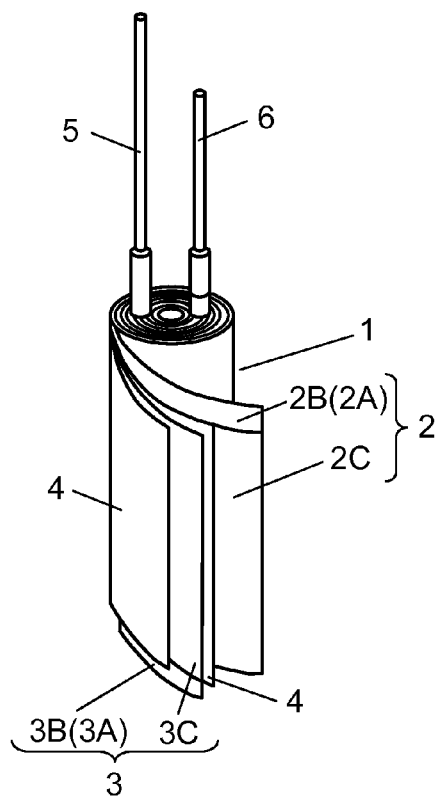
FIG. 2C is a fragmentary exploded perspective view of the capacitor element shown in FIG. 2A.
Figure 3A:
FIG. 3A is a plan view of a positive electrode used in the capacitor element shown in FIG. 2A.
Figure 3B:
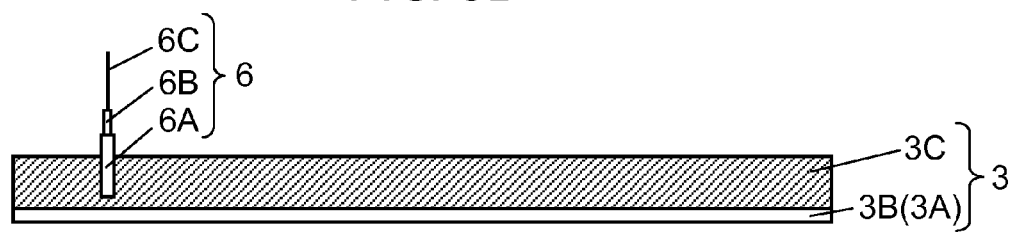
FIG. 3B is a plan view of a negative electrode used in the capacitor element in shown FIG. 2A.
Figure 3C:
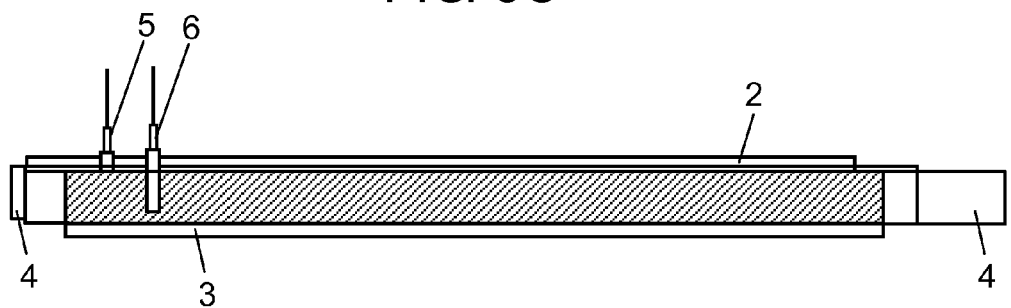
FIG. 3C is a plan view illustrating the capacitor element shown in FIG. 2A before winding.

FIG. 1A is a front sectional view of capacitor 83 in accordance with a first exemplary embodiment. FIG. 1B is a bottom view of capacitor 83. FIG. 2A is a perspective view from the top, illustrating a structure of capacitor element 1 and leads 5 and 6 used in capacitor 83. FIG. 2B is a perspective view from the bottom, illustrating capacitor element 1 and leads 5 and 6. FIG. 2C is a fragmentary exploded perspective view of capacitor element 1 and leads 5 and 6. FIG. 3A is a plan view illustrating a structure of positive electrode 2 and lead 5 configuring capacitor element 1. FIG. 3B is a plan view illustrating a structure of negative electrode 3 and lead 6 configuring capacitor element 1. FIG. 3C is a plan view illustrating capacitor element 1 before winding.

As shown in FIG. 1A, capacitor 83 includes wound capacitor element 1A, electrolyte (not illustrated) with which capacitor element 1 is impregnated, case 7, and sealing rubber 8 sealing an opening of case 7.

Capacitor element 1 includes positive electrode 2 that is a first electrode, negative electrode 3 that is a second electrode, and separator 4 disposed between positive electrode 2 and negative electrode 3. As shown in FIG. 3A, positive electrode 2 includes collector 2A that is a sheet-like first collector, polarized electrode layer (hereafter referred to as an electrode layer) 2C that is a first electrode layer formed on the surface of collector 2A, and lead 5 that is a first lead connected to collector 2A. As shown in FIG. 3B, negative electrode 3 facing positive electrode 2 includes collector 3A that is a sheet-like second collector, polarized electrode layer (hereafter referred to as an electrode layer) 3C that is a second electrode layer formed on the surface of collector 3A, and lead 6 that is a second lead connected to collector 3A. Collectors 2A and 3A are formed of a metal foil, such as aluminum. Electrode layers 2C and 3C are preferably configured mainly with activated carbon. Positive electrode 2, negative electrode 3, and separator 4 are wound around winding axis H. Capacitor element 1 has first end 1U and second end 1L on an opposite side of first end 1U in a direction along winding axis H.

The electrolyte contains imidazolium salt and/or quaternary ammonium salt as solute, and carbonates and/or lactones as solvent.

Case 7 and sealing rubber 8 configure an exterior housing that accommodates capacitor element 1 and electrolyte, and allows a part of leads 5 and 6 to pass therethrough. Case 7 is a bottomed cylindrical metal case made typically of aluminum because of its good workability. As shown in FIG. 1B, valve 7A is provided on the outer bottom face of case 7 to prevent explosion.

Sealing rubber 8 has holes through which leads 5 and 6 drawn from capacitor element 1 pass. Leads 5 and 6 pass through these holes, and sealing rubber 8 is fitted into the opening of case 7. Then, a peripheral face near the opening of case 7 is horizontally drawn, and an open end of case 7 is curled. In other words, horizontally drawn part 7B and curled part 7C are formed. Sealing rubber 8 is compressed in this way to seal case 7.

Sealing rubber 8 is formed of isobutylene isoprene rubber (IIR). IIR is preferable because it does not allow electrolyte to pass therethrough but releases gas generated inside capacitor 83 to the outside. However, a material of sealing rubber 8 is not limited to IIR. Ethylenepropylene teropolymer (EPT) that has similar characteristics, or a mixture of isobutylene isoprene rubber (IIR) and ethylenepropylene teropolymer (EPT) may be used. By forming sealing rubber 8 with such material, gas generated inside capacitor 83 can be released to the outside. A pressure regulating valve using a gas-permeable film thus becomes unnecessary. This allows capacitor 83 to be disposed horizontally or upside down. Accordingly, flexibility of attachment of capacitor 83 to a target device is significantly improved on manufacturing a capacitor module by connecting multiple capacitors 83.

Next, a structure of capacitor element 1 is detailed. As shown in FIGS. 2A to 2C, capacitor element 1 is formed such that separator 4 is provided between sheet-like positive electrode 2 and negative electrode 3 facing each other and they are wound together. In capacitor element 1, positive electrode 2 and negative electrode 3 face each other in a deviated manner that they protrude in opposite directions. A part of positive electrode 2 and a part of negative electrode come out separately at both ends in a direction along winding axis H, respectively. More specifically, positive electrode 2 protrudes at first end 1U, and negative electrode 3 protrudes at second end 1L.

As shown in FIGS. 3A and 3B, positive electrode 2 has exposed part 2B that is a first exposed part where collector 2A is exposed at one end and negative electrode 3 has exposed part 3B that is a second exposed part where collector 3A is exposed at one end. As shown in FIG. 3C, each electrode is disposed such that exposed parts 2B and 3B come to opposite sides and also in a deviated manner. Separator 4 is disposed between positive electrode 2 and negative electrode 3, and they are wound to form capacitor element 1. As a result, exposed part 2B and exposed part 3B protrude at opposite ends in the direction along winding axis H of capacitor element 1. In other words, collector 2A has exposed part 2B exposed from electrode layer 2C at first end 1U. Collector 3A has exposed part 3B exposed from electrode layer 3C at second end 1L.

As shown in FIGS. 3A and 3B, leads 5 and 6 are connected to positive electrode 2 and negative electrode 3, respectively. Leads 5 and 6 include cylindrical airtight stoppers 5B and 6B, electrode connectors 5A and 6A, and external connecting wires 5C and 6C, respectively. Airtight stoppers 5B and 6B are formed of aluminum wires. Electrode connectors 5A and 6A are formed by flattening one end of each of airtight stoppers 5B and 6B. External connecting wires 5C and 6C are formed of tinned copper-plated steel wire, so-called CP wire, and are welded to the other end of each of airtight stoppers 5B and 6B.

Electrode connectors 5A and 6A are connected to collectors 2A and 3A typically by welding or caulking. Areas of collectors 2A and 3A connected to electrode connectors 5A and 6A is preferably exposed by partially removing polarized electrode layers 2C and 3C. This reduces interconnection resistance, and improves connection strength.

Lead 5 is connected to collector 2A such that external connecting wire 5C protrudes in a direction same as a direction that exposed part 2B is formed. Lead 6 is connected such that external connecting wire 6C protrudes in a direction opposite to a direction of forming exposed part 3B. In other words, external connecting wires 5C and 6C protrude from first end 1U. This is because exposed part 2B is disposed inside case 7 near the opening of case 7. However, leads 5 and 6 may be led out from the opposite direction, depending on the shape of case 7 and a sealing structure.

When leads 5 and 6 are inserted into sealing rubber 8, airtight stoppers 5B and 6B are positioned at a pair of insert holes (not illustrated) that are through-holes provided in sealing rubber 8. This makes thick airtight stoppers 5B and 6B fill the through-holes. These insert holes can thus be sealed. External connecting wires 5C and 6C connected to each of airtight stoppers 5B and 6B at first ends thereof protrude from sealing rubber 8.

When leads 5 and 6 are connected and fixed to collectors 2A and 3A, respectively, at least one of connecting points may be formed on exposed parts 2B and 3B. Alternatively, leads 5 and 6 may be directly connected to polarized electrode layers 2C and 3C, typically by caulking, and the connecting points may be formed at least on exposed parts 2B and 3B. In these structures, leads 5 and 6 are electrically connected to exposed parts 2B and 3B, respectively, at least. Accordingly, electrical connection can be secured without removing polarized electrode layers 2C and 3C. This increases productivity.

Lead 6 connected to negative electrode 3 may contact exposed part 2B and cause short-circuiting when negative electrode 3 is overlaid on positive electrode 2 via separator 4. To prevent this, a portion of lead 6 contacting exposed part 2B of positive electrode 2 is preferably insulated. More specifically, insulating resin is preferably applied (not illustrated) or insulating tape (not illustrated) is preferably attached. In addition, to suppress current running to case 7 due to attachment of exposed part 3B at second end 1L of capacitor element 1 and the inner bottom face of case 7, insulator 9 may be provided between capacitor element 1 and the inner bottom face of case 7.

Positive electrode 2 (exposed part 2B) and negative electrode 3 (exposed part 3B) exposed at end faces of capacitor element 1 are welded. Alternatively, swaging is also applicable. As shown in FIGS. 2A and 2B, electrode machined parts 1A and 1B are provided to electrically connect portions in each electrode closely laminated from the center to a periphery of capacitor element 1 by one of these machining processes. More specifically, two or more points of exposed part 2B are electrically connected together, and two or more points of exposed part 3B are electrically connected together. In other words, electrode machined part 1A that is welded typically by laser-welding is provided on exposed part 2B. Electrode machined part 1B that is welded typically by laser welding is provided on exposed part 3B.

By providing electrode machined parts 1A and 1B, a current-collecting distance can be shortened. In other words, there is no need to collect current running from every part of long collectors 2A and 3A to leads 5 and 6 in a winding direction of collectors 2A and 3A made of metal foil. Accordingly, resistance of positive electrode 2 and negative electrode 3 can be drastically reduced to enable charging and discharging of large current. In addition, since voltage drop due to resistance can be reduced, a capacity use rate can be increased. This effect is further detailed with reference to FIGS. 4A to 5.

Figure 4A:
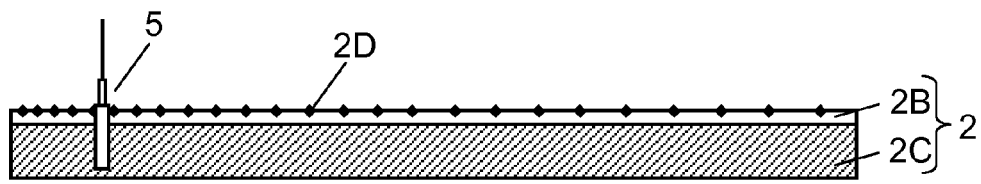
FIG. 4A is a plan view of the positive electrode and a lead used in the capacitor element that is used for simulating current distribution in the electrode, in the first exemplary embodiment.
Figure 4B:
FIG. 4B is a plan view of a positive electrode and a lead used in a capacitor element that is used for simulating current distribution in the electrode, for comparison.

FIG. 4A is a plan view (development view) of positive electrode 2 in capacitor element 1 used for simulating current distribution inside the electrode. FIG. 4B is a plan view of positive electrode 202 in a capacitor element for comparison used for the same simulation.

Lead 5 is connected to positive electrode 2 shown in FIG. 4A, and multiple welding marks 2D configuring electrode machined part 1A are formed at an end of exposed part 2B. On the other hand, as shown in FIG. 4B, welding marks 2D are not provided and lead 5 is just connected to positive electrode 202 on the comparison.

Figure 5:
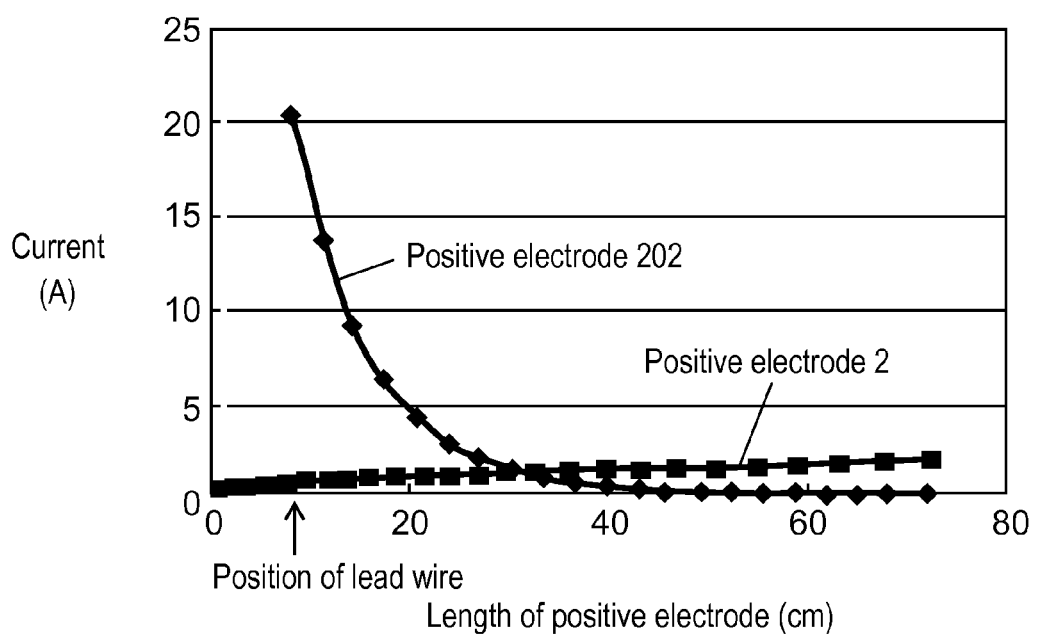
FIG. 5 is a current distribution chart simulating distribution of current running in the electrode in a distributed manner.

FIG. 5 is a current distribution chart indicating simulation results of current distribution in positive electrodes 2 and 202 shown in FIGS. 4A and 4B. The length of electrode foil (collector) is taken along the horizontal axis, and magnitude of current running in the electrode foil is taken along the vertical axis. The chart shows the magnitude of current running at multiple points of the electrode foil lengthwise.

It is apparent from FIG. 5 that, in positive electrode 202, the largest current is concentrated on a part connected to lead 5. Current reaches close to zero with distance from this point. On the other hand, in positive electrode 2, electrode machined part 1A (welding marks 2D) in which multiple points of collector 2A are electrically connected is provided by partially welding the end face of capacitor element 1. Therefore, the largest current does not concentrate on the point where lead 5 is connected. A small current is distributed throughout positive electrode 2.

FIG. 6 illustrates results of simulating difference in resistance by the size of electrode machined part 1A (the number of welding marks 2D). Sample A has multiple welding marks 2D formed when linear electrode machined part 1A is formed extending in two radial directions (two portions) at first end 1U of wound capacitor element 1. Sample B has multiple welding marks 2D formed when linear electrode machined part 1A extending in one radial direction is formed. Sample C has multiple welding marks 2D formed when intermittent linear electrode machined part 1A extending in one radial direction is formed. Sample D has no electrode machined part 1A.

Resistance values are obtained by simulating these four samples of capacitor element. The length of collector 2A is 80 cm. As shown in FIG. 6, the resistance values are extremely low at 2.76 to 3.10 mΩ in Samples A to C in which electrode machined part 1A is provided, whereas the resistance value is 13.41 mΩ in the capacitor element of Sample D. When comparing Samples A to C, there is no great difference although the resistance reduces as electrode machined part 1A becomes large. Low resistance can thus be achieved by providing electrode machined part 1A larger than a predetermined size. In Sample C, welding mark 2D is provided at 16 points in 80-cm long collector 2A. However, the number of welding marks 2D required depends on the length of collector 2A. Accordingly, two welding marks 2D may be sufficient in some cases.

As described above, low resistance can be achieved by providing electrode machined parts 1A and 1B on both end faces in a direction along winding axis H of capacitor element 1. Large current can be supported with a simple structure, and thus a capacitor with high power density can be manufactured.

Leads 5 and 6 are led out in the same direction from capacitor element 1 in capacitor 83 as configured above. Positive electrode 2 is welded onto exposed part 2B at first end 1U of capacitor element 1, and negative electrode 3 is welded onto exposed part 3B at second end 1L. More specifically, electrode machined parts 1A and 1B are provided electrically connecting positive electrode 2 and negative electrode 3 at multiple points, respectively, that are closely attached in a laminated manner from the center to periphery of capacitor element 1. With this structure, current does not concentrate only on a part where leads 5 and 6 are connected to positive electrode 2 and negative electrode 3. Current can thus be distributed to entire positive electrode 2 and negative electrode 3. Therefore, resistance values of positive electrode 2 and negative electrode 3 can be remarkably decreased.

Figure 7A:
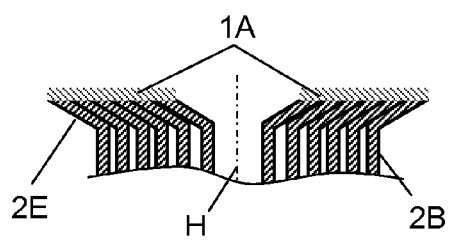
FIG. 7A is a fragmentary sectional view of a capacitor element in another capacitor in accordance with the first exemplary embodiment.
Figure 7B:
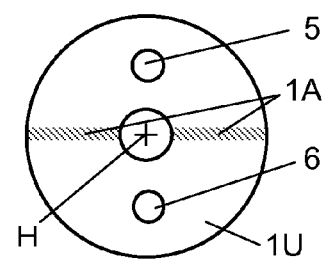
FIG. 7B is a top view of the capacitor element shown in FIG. 7A.
Figure 8A:
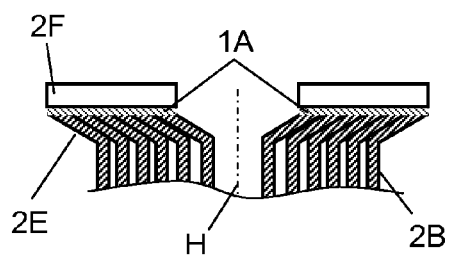
FIG. 8A is a fragmentary sectional view of a capacitor element in still another capacitor in accordance with the first exemplary embodiment.
Figure 8B:
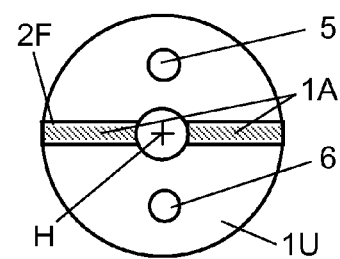
FIG. 8B is a top view of the capacitor element shown in FIG. 8A.

Next is described another structure of electrode machined parts 1A and 1B, with electrode machined part 1A being described as a representative sample with reference to FIGS. 7A to 8B. The same structure is applicable to electrode machined part 1B. FIG. 7A is a fragmentary sectional view of a capacitor element in another capacitor in the exemplary embodiment. It shows a cross section around electrode machined part 1A. FIG. 7B is a top view of the capacitor element shown in FIG. 7A. It shows the top face of first end 1U. FIG. 8A is a fragmentary sectional view of a capacitor element in still another capacitor in the exemplary embodiment. It shows a cross section around electrode machined part 1A. FIG. 8B is a top view of the capacitor element in FIG. 8A. It shows the top face of first end 1U.

In the structure shown in FIG. 7A, bend portion 2E with flat part on the end face of capacitor element is formed by bending exposed part 2B. Electrode machined part 1A is provided at the flat part of bend portion 2E. In other words, two or more points on exposed part 2B are electrically connected at bend portion 2E. In this case, an area where electrode machined part 1A can be formed increases, compared to the structure of forming electrode machined part 1A only on an edge of upright exposed part 2B. This is preferable for reducing interconnection resistance at multiple points of exposed part 2B.

Preferably, as shown in FIG. 7B, bend portion 2E is formed in a radial direction of first end 1U of wound capacitor element 1, and electrode machined part 1A that is welding marks electrically connecting bend portion 2E is formed in a radial direction of first end 1U of capacitor element 1. In particular, exposed part 2B is further preferably bent away from winding axis H of capacitor element 1 on forming bend portion 2E. This prevents formation of a wrinkle-like overlaid portion in exposed part 2B on bending exposed part 2B. Accordingly, the number of overlaid foils on forming bend portion 2E can be easily controlled.

Furthermore, bend portion 2E is preferably formed such that the formation area of bend portion 2E is smaller than an area where bend portion 2E is not formed on first end 1U. Exposed part 2B is a face perpendicular to the direction along winding axis H of capacitor element 1 at first end U. An area of bend portion 2E is smaller than an area of the above face subtracting the area of bend portion 2E. This suppresses short-circuiting caused by contact of bend portion 2E, which is a part of positive electrode 2, and lead 6 connected to negative electrode 3. The area of first end 1U is an area surrounded by an outline when the outline is edges of collector 2A disposed at the outermost periphery of capacitor element in FIG. 7B.

Furthermore, bend portion 2E is preferably formed linearly toward the radial direction centering on winding axis H at first end 1U. This can shorten the current-collecting distance efficiently with a small formation area of bend portion 2E.

Furthermore, electrode machined part 1A is preferably formed such that a portion where exposed part 2B is overlaid and welded is provided at multiple points in one bending portion 2E on forming electrode machined part 1A on bend portion 2E linearly formed in a radial direction. This structure can suppress the height of the capacitor element by broadening the width of exposed part 2B by overlaying exposed part 2B at multiple points to the extent that no hole is created in exposed part 2B at welding.

Furthermore, as shown in FIGS. 8A and 8B, flat power-collection auxiliary member 2F is disposed on a flat part formed by bend portion 2E. Electrode machined part 1A may be formed by welding power-collection auxiliary member 2F and bend portion 2E. Power-collection auxiliary member 2F is formed of the same material as collector 2A or metal that can be welded onto collector 2A. Or, power-collection auxiliary member 2F formed of a conductive material other than metal may be electrically connected to exposed part 2B at two or more points. In this case, multiple points in positive electrode 2 are connected via power-collection auxiliary member 2F, and thus resistance inside positive electrode 2 can be further reduced.

In the above description, electrode machined part 1A is provided on exposed part 2B of positive electrode 2 exposed at first end 1U of capacitor element 1. Electrode machined part 1B is provided on exposed part 3B of negative electrode 3 exposed at second end 1L. However, as long as electrode machined part 1A or 1B is provided on either positive electrode 2 or negative electrode 3, the above effect is achieved. Also for the bend portion, the above effect is achieved by providing a bend portion on at least one of exposed parts 2B and 3B.

Figure 9A:
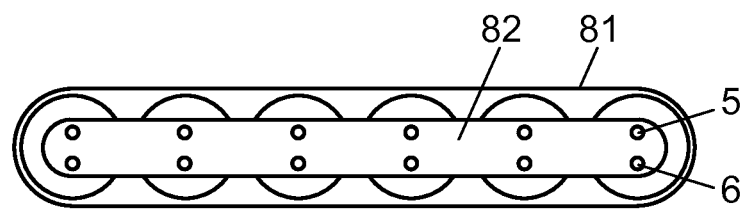
FIG. 9A is a plan view of a capacitor module in the first exemplary embodiment.
Figure 9B:
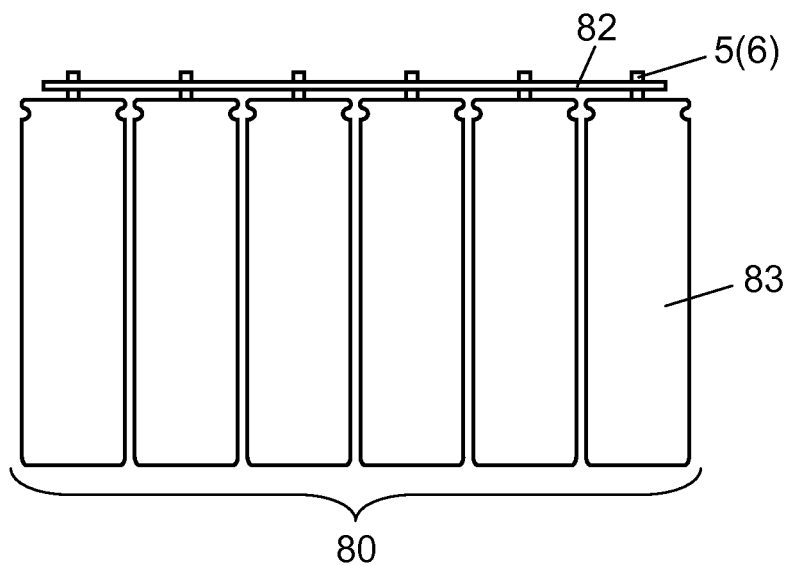
FIG. 9B is a front view of the capacitor module shown in FIG. 9A.

Next, a capacitor module formed by connecting multiple capacitors in FIG. 1A is described with reference to FIGS. 9A and 9B. FIG. 9A is a plan view illustrating a structure of the capacitor module in the exemplary embodiment. FIG. 9B is its front view. Capacitor module 80 includes multiple capacitors 83, wiring board 82, and module case 81.

Wiring board 82 is connected to leads 5 and 6 of each of capacitors 83 to connect capacitors 83. Module case 81 houses capacitors 83. In FIG. 9A, six capacitors are connected in parallel as an example. However, two or more capacitors 83 may be connected in parallel or series. In addition, capacitors 83 may be connected in combination of parallel and series. For this purpose, a wiring pattern of wiring board 82 may be changed.

A wiring pattern (not illustrated) is provided on wiring board 82. By soldering leads 5 and 6 led out from capacitors 83 to wiring board 82, six capacitors 83 are connected in parallel via this wiring pattern. Other than wiring board 82, other wiring members, such as a connecting bar, may be used for connecting multiple capacitors 83.

Capacitor module 80 includes capacitors 83 and a wiring member such as wiring board 82. Capacitor module 80 can charge and discharge with a large current and have large power density by maximizing the effect obtained by capacitors 83. Furthermore, capacitor module 80 can be downsized and made lighter, and can achieve cost reduction at the same time. In addition, a module structure with higher flexibility to dispose capacitors 83 horizontally or upside down, as described above, can be adopted.

Capacitors in capacitor module 80 may be those described in the following second to fourth exemplary embodiments.

Second Exemplary Embodiment

Figure 10:
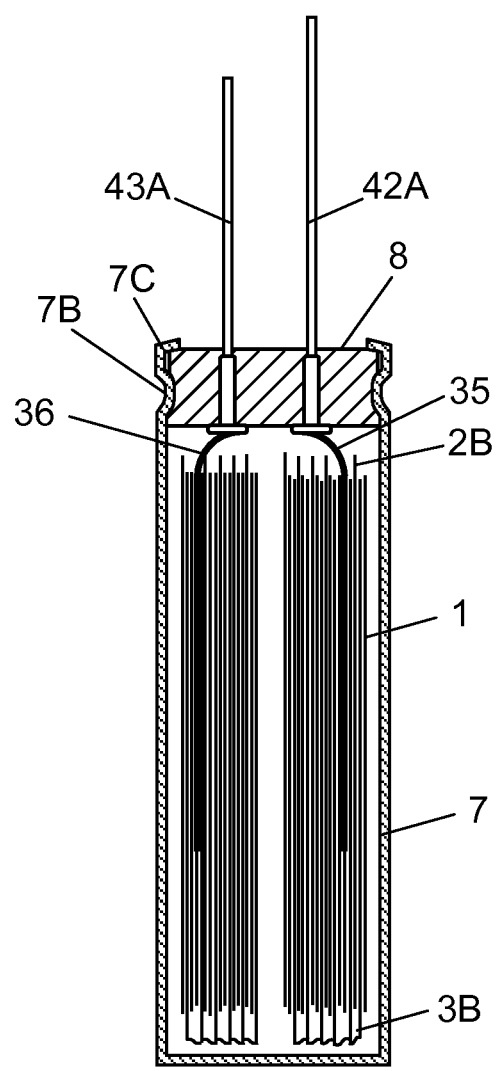
FIG. 10 is a front sectional view of a capacitor in accordance with a second exemplary embodiment.
Figure 11:
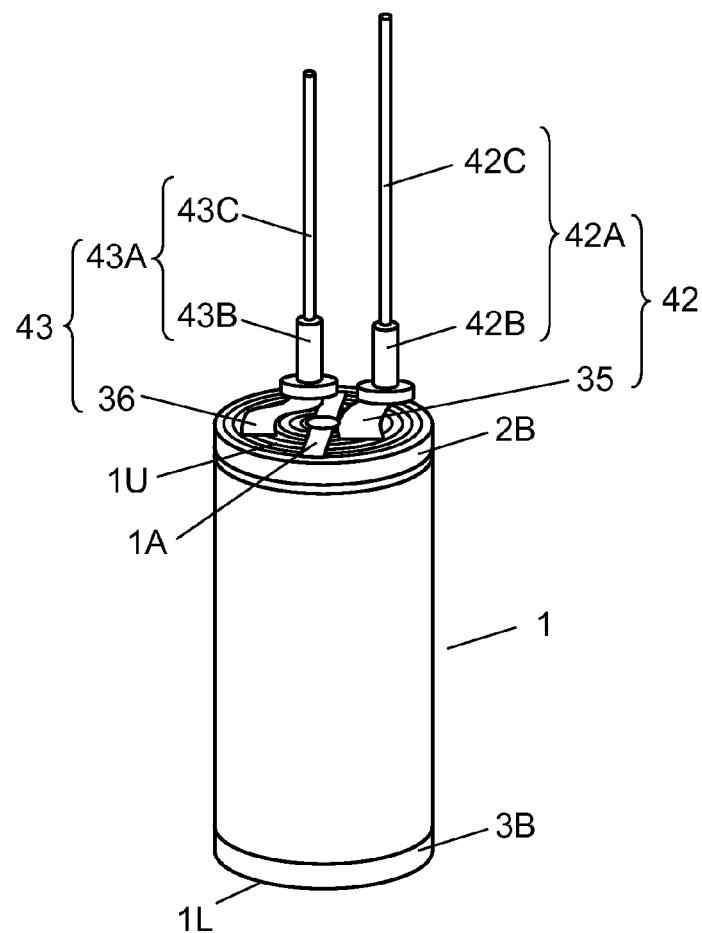
FIG. 11 is a perspective view of a capacitor element in the capacitor shown in FIG. 10.
Figure 12:
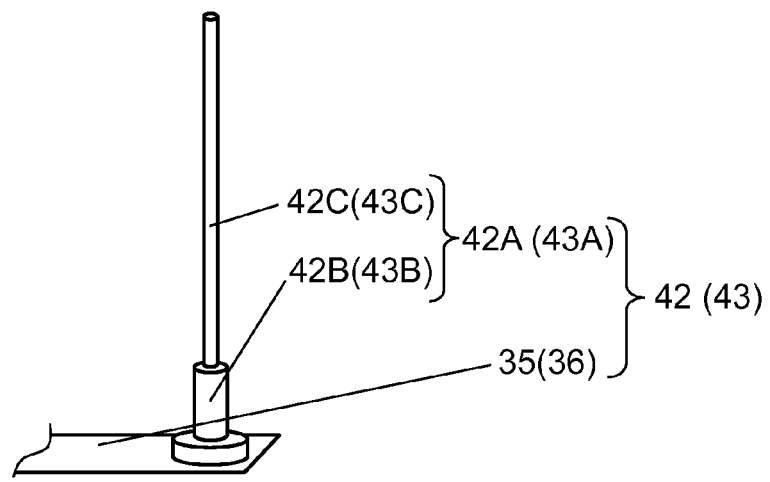
FIG. 12 is a perspective view of a lead used in the capacitor element shown in FIG. 11.

FIG. 10 is a front sectional view illustrating a capacitor in the second exemplary embodiment. FIG. 11 is a perspective view from the top, illustrating a structure of a lead and capacitor element used in the capacitor shown in FIG. 10. FIG. 12 is a perspective view from the top, illustrating a part of a structure of the lead shown in FIG. 11.

The capacitor in the exemplary embodiment includes capacitor element 1 in which positive electrode 2, negative electrode 3, and separator 4 are wound, case 7, and sealing rubber 8. A part of first end 1U (exposed part 2B) of capacitor element 1 is laser-welded, and multiple points of positive electrode 2 are electrically connected (specifically, adjacent points in the wound state) to provide electrode machined part 1A. Although not illustrated, multiple points of negative electrode 3 are also electrically connected at second end 1L (exposed part 3B) to provide an electrode machined part. Leads 42 and 43 are electrically connected to positive electrode 2 and negative electrode 3, respectively. They protrude outside case 7 through sealing rubber 8. Case 7 accommodates capacitor element 1 together with electrolyte. Sealing rubber 8 seals an opening of case 7. These basic structures are the same as the first exemplary embodiment. A different point from the first exemplary embodiment is the structure of the leads.

Lead 42 includes lead wire 42A and lead plate 35 connected to positive electrode 2. Lead wire 42A includes rivet 42B connected to lead plate 35 and external connecting wire 42C welded to rivet 42B. In the same way, lead 43 includes lead wire 43A and lead plate 36 connected to negative electrode 3. Lead wire 43A includes rivet 43B connected to lead plate 36 and external connecting wire 43C welded to rivet 43B. Both lead plates 35 and 36 protrude from capacitor element 1 in the same direction (the same side). External connecting wires 42C and 43C are inserted through a pair of through-holes created in sealing rubber 8, and their ends protrude outside case 7.

Lead plates 35 and 36 are formed, for example, by cutting a metal foil or thin sheet, typically aluminum, into a strip. First ends of lead plates 35 and 36 are connected to collectors 2A and 3A typically by cold-welding or ultrasonic-welding, respectively. Second ends protrude from first end 1U of capacitor element 1. Rivets 42B and 43B are made of aluminum, same as leads 35 and 36. External connecting wires 42C and 43C are formed of tinned copper-plated steel wire (so-called CP wire) or copper wire. The bottoms of rivets 42B and 43B contact leads 35 and 36, and are mechanically and electrically connected to leads 35 and 36 typically by ultrasonic-welding or laser-welding, respectively.

Also in this exemplary embodiment, change of resistance by the size of electrode machined part 1A (the number of welding marks 2D) is simulated, same as the first exemplary embodiment described with reference to FIG. 6. Sample E of capacitor element 1 has the number of welding marks 2D when linear electrode machined part 1A is formed in two radial directions (two points) at an end of wound capacitor element 1 (equivalent to Sample A). Sample F has linear electrode machined part 1A formed in one radial direction (equivalent to Sample B), and Sample G has no electrode machined part 1A. In the above examples, the length of collector 2A is 250 cm and the width of polarized electrode layer 2C is 117 mm.

Simulation results show that resistance values are extremely low at 0.54 mΩ in Sample E and 1.04 mΩ in Sample F, whereas a resistance value of Sample G without electrode machined part 1A is 3.02 mΩ. Accordingly, resistance reduces as the size of electrode machined part 1A becomes larger. Low resistance value can be achieved by providing electrode machined part 1A with a predetermined size or greater.

The number of lead plates 35 and 36 connected to lead wires 42A and 43A is not limited to one each. Multiple lead plates 35 and 36 may be provided, and bundles of lead plates 35 and 36 may be connected to lead wires 42A and 43A, respectively.

Furthermore, lead plates 35 and 36 may contact and be electrically connected only to exposed parts 2B and 3B, respectively. Or, lead plates 35 and 36 may be connected to both a portion where electrode layers 2C and 3C are partially removed and exposed parts 2B and 3B, respectively.

As in the first exemplary embodiment, lead 43 connected to negative electrode 3, in particular lead plate 36, may cause short-circuiting by touching exposed part 2B. To prevent it, a portion in contact with exposed part 2B of lead plate 36 is preferably insulated.

Third Exemplary Embodiment

Figure 13:
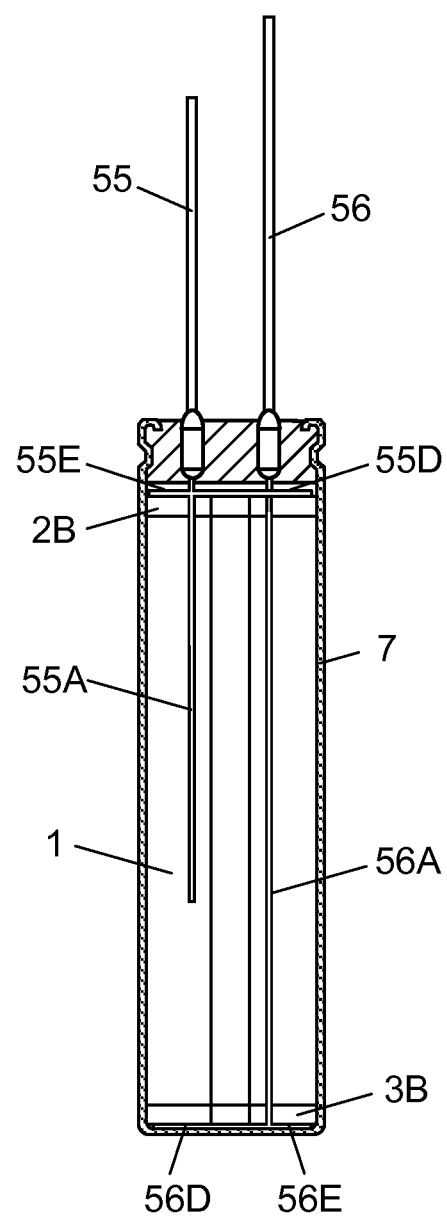
FIG. 13 is a front sectional view of a capacitor in accordance with a third exemplary embodiment.

FIG. 13 is a front sectional view illustrating a structure of a capacitor in the third exemplary embodiment. In the capacitor according to this exemplary embodiment, leads 55 and 56 are connected to positive electrode 2 and negative electrode 3, respectively, instead of leads 5 and 6 in the first exemplary embodiment.

Figure 14A:
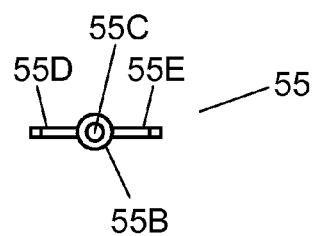
FIG. 14A is a plan view of a first lead used in the capacitor shown in FIG. 13.
Figure 14B:
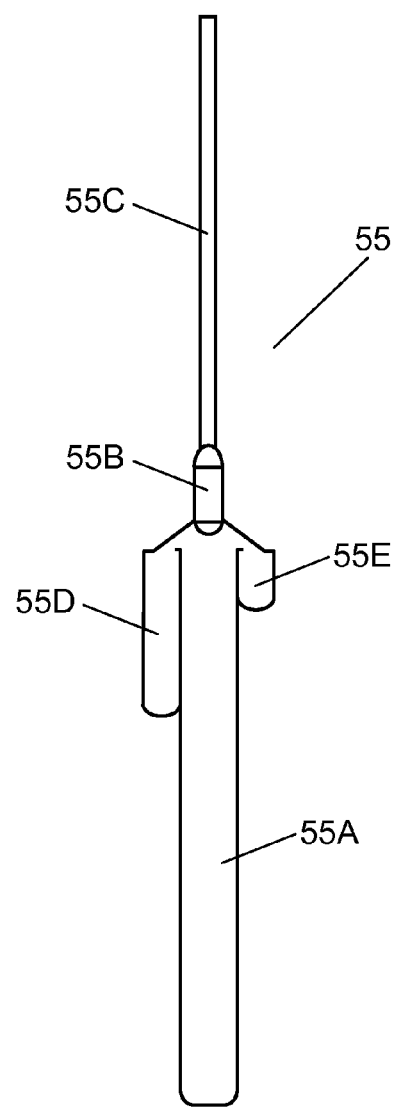
FIG. 14B is a front view of the first lead shown in FIG. 14A.
Figure 15A:
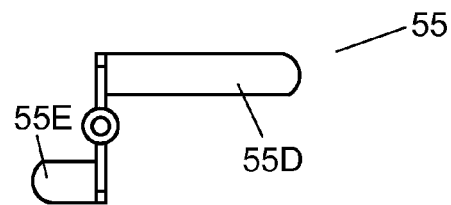
FIG. 15A is a plan view illustrating the first lead shown in FIG. 14A after connection to the capacitor element.
Figure 15B:
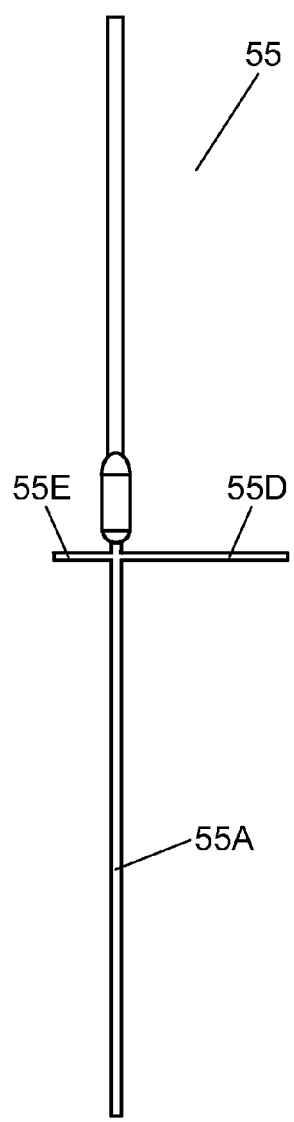
FIG. 15B is a side view of the first lead shown in FIG. 15A.
Figure 16A:
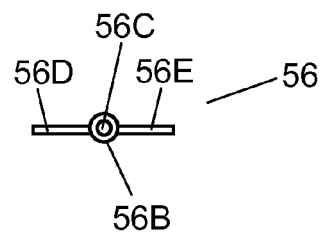
FIG. 16A is a plan view of a second lead used in the capacitor shown in FIG. 13.
Figure 16B:
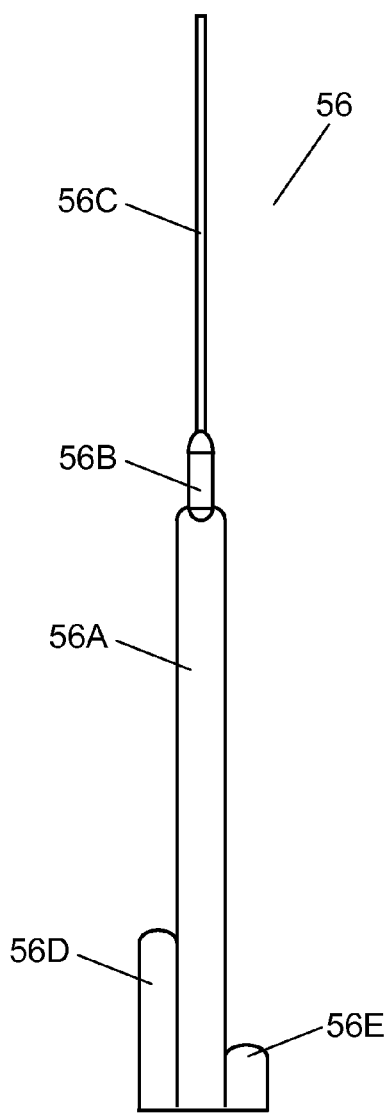
FIG. 16B is a plan view of the second lead shown in FIG. 16A.
Figure 17A:
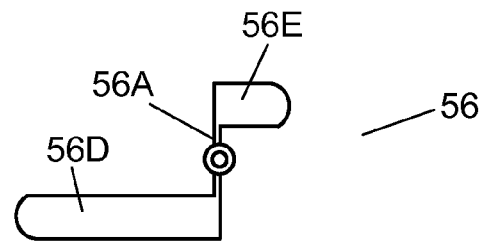
FIG. 17A is a plan view illustrating the second lead shown in FIG. 16A after connection to the capacitor element.
Figure 17B:
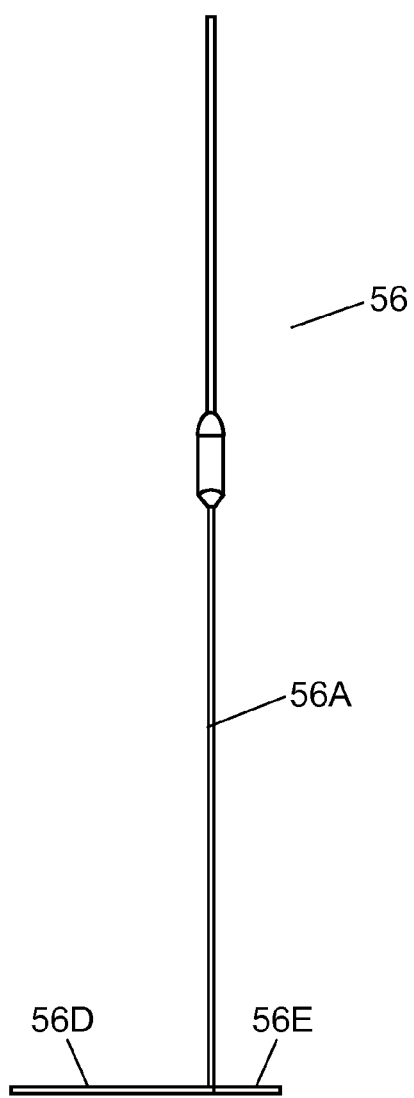
FIG. 17B is a side view of the second lead shown in FIG. 17A.

FIG. 14A and FIG. 14B are a plan view and a front view of lead 55. FIG. 15A and FIG. 15B are a plan view and a side view illustrating the state that lead 55 is connected to capacitor element 1. FIG. 16A and FIG. 16B are a plan view and a front view of lead 56. FIG. 17A and FIG. 17B are a plan view and a side view illustrating the state that lead 56 is connected to capacitor element 1.

As shown in FIGS. 14A to 15B, lead 55 includes electrode connector 55A, airtight stopper 55B, and external connecting wire 55C that is an externally-protruded part protruding outside of the exterior housing, same as lead 5 in the first exemplary embodiment. Lead 55 further includes second electrode connectors 55D and 55E in addition to electrode connector 55A that is a first electrode connector.

As shown in FIG. 14B, second electrode connectors 55D and 55E extend from one end of electrode connector 55A. In addition, electrode connector 55A and second electrode connectors 55D and 55E are integrally configured as a flat sheet. As shown in FIGS. 15A and 15B, second electrode connectors 55D and 55E are bent at their start points extending from electrode connector 55A when connected to capacitor element 1, so as to extend perpendicular to the flat face of electrode connector 55A. By extending perpendicularly in this way, second electrode connectors 55D and 55E can contact the end face of exposed part 2B formed at first end 1U of capacitor element 1 in the flat portion thereof. Second electrode connectors 55D and 55E are bent in opposite directions from each other. In this way, bend parts are formed at a connecting portion of second electrode connectors 55D and 55E and electrode connector 55A.

On the other hand, as shown in FIGS. 16A to 17B, lead 56 includes electrode connector 56A, airtight stopper 56B, and external connecting wire 56C that is an externally-protruded part protruding outside of the exterior housing, same as lead 6 in the first exemplary embodiment. Lead 56 further includes second electrode connectors 56D and 56E in addition to electrode connector 56A that is a first electrode connector.

As shown in FIG. 16B, second electrode connectors 56D and 56E extend from one end of electrode connector 56A. Electrode connector 56A and second electrode connectors 56D and 56E are integrally configured as a flat sheet. As shown in FIGS. 17A and 17B, second electrode connectors 56D and 56E are bent at their start points extending from electrode connector 56A when connected to capacitor element 1, and extend perpendicular to the flat face of electrode connector 56A. By extending perpendicularly in this way, second electrode connectors 56D and 56E can contact the end face of exposed part 3B formed at second end 1L of capacitor element 1 in a flat portion. Second electrode connectors 56D and 56E are bent in opposite directions to each other. In this way, bend parts are formed at a connecting portion of second electrode connectors 56D and 56E and electrode connector 56A.

Second electrode connectors 55D and 55E are welded and connected to exposed part 2B by laser-welding second electrode connectors 55D and 55E from outside in the state that second electrode connectors 55D and 55E are in contact with exposed part 2B. In other words, electrode connector 55A is connected to collector 2A at a point other than exposed part 2B, and second electrode connectors 55D and 55E are connected to electrode connector 55A and exposed part 2B.

On the other hand, second electrode connectors 56D and 56E are welded and connected to exposed part 3B by laser-welding second electrode connectors 56D and 56E from outside in the state that second electrode connectors 56D and 56E are in contact with exposed part 3B. In other words, electrode connector 56A is connected to collector 3A at a point other than exposed part 3B, and second electrode connectors 56D and 56E are connected to electrode connector 56A and exposed part 3B.

These connecting structures can reduce resistance between capacitor element 1 and leads 55 and 56.

Second electrode connectors 55D and 55E are integrally formed with electrode connector 55A as a flat sheet. Second electrode connectors 56D and 56E are integrally formed with electrode connector 56A as a flat sheet. Therefore, second electrode connectors 55D, 55E, 56D, and 56E can be formed simultaneously when flat electrode connectors 55A and 56A are formed by pressing from airtight stoppers 55B and 56B, respectively. This structure is preferable with respect to productivity.

Furthermore, a notch is provided between electrode connector 55A and second electrode connectors 55D and 55E. In the same way, a notch is provided between electrode connector 56A and second electrode connectors 56D and 56E. These notches are preferably created to leave a portion near the top end of electrode connector 55A and a portion near the bottom end of electrode connector 56A. With this structure, a reaction force generated in second electrode connectors 55D, 55E, 56D, and 56E against bending acts in a direction toward the end faces (first end 1U and second end 1L) when second electrode connectors 55D, 55E, 56D, and 56E are bent to contact each end face. Accordingly, a stress on connecting boundary can be reduced on welding for connection.

Second electrode connectors 55D, 55E, 56D, and 56E of leads 55 and 56 may be extended from airtight stoppers 55B and 56B or external connecting wires 55C and 56C.

Figure 18A:
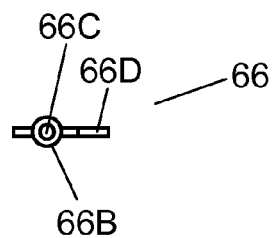
FIG. 18A is a plan view of another second lead used in the capacitor shown in FIG. 13.
Figure 18B:
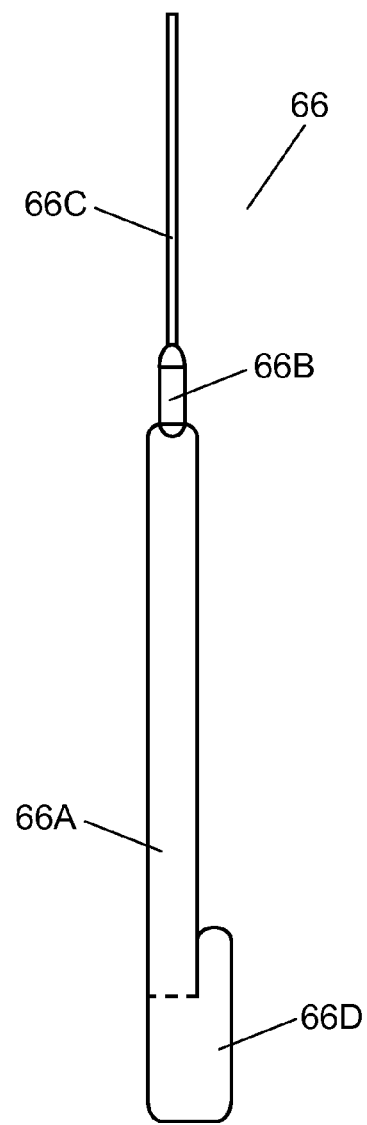
FIG. 18B is a front view of the second lead shown in FIG. 18A.
Figure 19A:
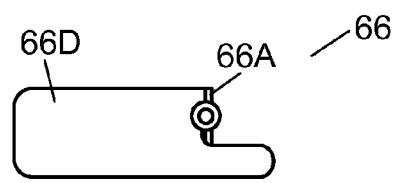
FIG. 19A is a plan view illustrating the second lead shown in FIG. 18A after connection to the capacitor element.
Figure 19B:
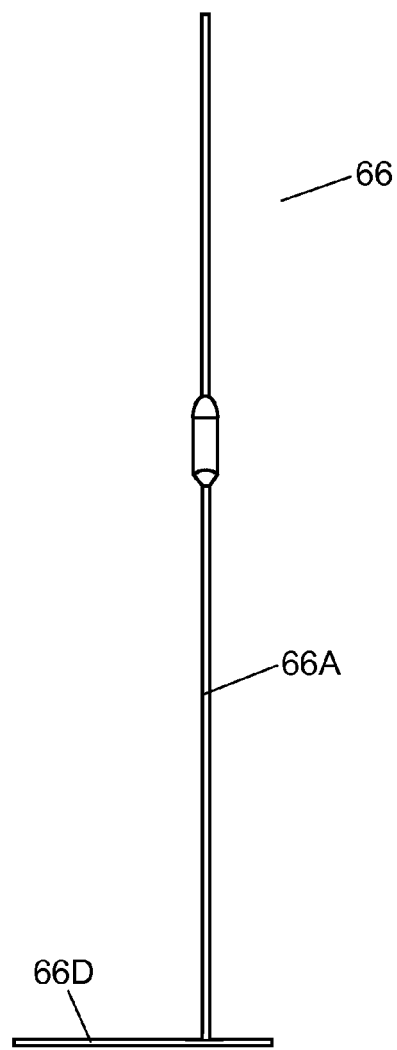
FIG. 19B is a side view of the second lead shown in FIG. 19A.

Next, another structure of lead connected to negative electrode 3 is described with reference to FIGS. 18A to 19B. FIG. 18A and FIG. 18B are a plan view and a front view of lead 66 with another structure used in the capacitor in this exemplary embodiment. FIG. 19A and FIG. 19B are a plan view and a side view illustrating the state that lead 66 is connected to capacitor element 1.

Lead 66 includes electrode connector 66A, airtight stopper 66B, and external connecting wire 66C. Lead 66 also includes second electrode connector 66D in addition to electrode connector 66A that is a first electrode connector. Lead 66 is used for connecting to second end 1L facing the bottom of case 7 of capacitor element 1. In other words, lead 66 is used for contact with second end 1L in a direction (a side) that external connecting wire 66C does not protrude.

As shown in FIG. 16B, lead 56 includes second electrode connectors 56D and 56E provided at both sides of electrode connector 56A. On the other hand, as shown in FIG. 18B, lead 66 is connected at the bottom end of electrode connector 66A, and includes bent and extended second electrode connector 66D. Lead 66 with this structure may be applied instead of lead 56.

Fourth Exemplary Embodiment

Figure 20A:
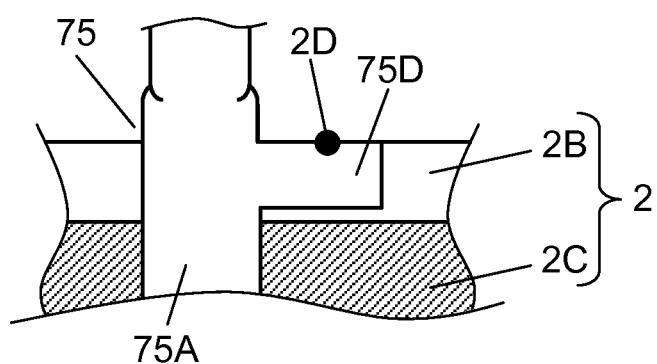
FIG. 20A is a fragmentary plan view of a positive electrode used in a capacitor in accordance with a fourth exemplary embodiment.
Figure 20B:
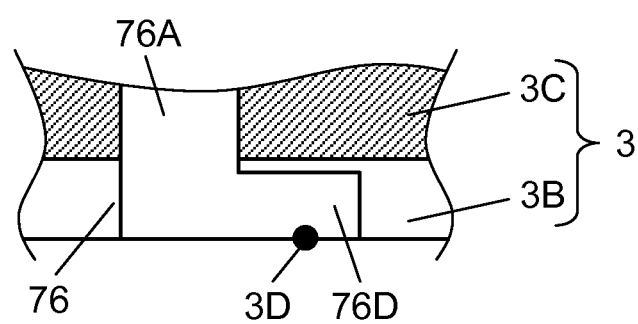
FIG. 20B is a fragmentary plan view of a negative electrode used in the capacitor in the fourth exemplary embodiment.

FIG. 20A is a fragmentary plan view of a positive electrode used in a capacitor in the fourth exemplary embodiment. FIG. 20B is a fragmentary plan view of a negative electrode used in this capacitor. In this exemplary embodiment, leads 75 and 76 are used instead of leads 5 and 6 in the first exemplary embodiment.

Lead 75 includes electrode connector 75A and flat extended part 75D. Extended part 75D integrally extends from one end of electrode connector 75A. Or, extended part 75D may be formed of a conductive material electrically connected to one end of electrode connector 75A. An electrode machined part same as electrode machined part 1A shown in FIG. 2A is formed on one edge of extended part 75D, while welding mark 2D is formed by being welded to exposed part 2B. In other words, lead 75 has an edge parallel to an edge of exposed part 2B, and the edge of lead 75 is welded together with exposed part 2B.

In the same way, lead 76 includes electrode connector 76A and flat extended part 76D. Extended part 76D integrally extends from one end of electrode connector 76A. Or, extended part 76D may be formed of a conductive material electrically connected to one end of electrode connector 76A. An electrode machined part same as electrode machined part 1B shown in FIG. 2B is formed on one end of extended part 76D, while welding mark 3D is formed by being welded to exposed part 3B. In other words, lead 76 has an edge parallel to an edge of exposed part 3B, and the edge of lead 76 is welded together with exposed part 3B.

To form welding marks 2D and 3D using extended parts 75D and 76D, ends of extended parts 75D and 76D are preferably formed on the same face as the edge of exposed parts 2B and 3B. However, there may be some difference in height between the edge of extended part 75D and the edge of exposed part 2B or between the edge of extended part 76D and the edge of exposed part 3B, as long as welding is feasible.

This reduces interconnection resistance at a boundary of capacitor element 1 and leads 75 and 76 because leads 75 and 76 can be welded together with electrode machined parts 1A and 1B.

In the above description, lead 76 is connected to welding mark 3D formed on extended part 76D at second end 1L of capacitor element 1. However, lead 76 and electrode machined part 1A may be welded and connected by extending one end of electrode connector 76A to the edge of exposed part 3B and forming welding mark 3D on this edge, without providing extended part 76D.

In the first to fourth exemplary embodiments, an electric double-layer capacitor is used as an example of a capacitor for description. However, application of the structures of the present embodiments is not limited to this capacitor. For example, the same effect is achieved by applying the present structures to a capacitor called an electrochemical capacitor. The electrochemical capacitor includes an element employing a positive electrode in which a polarized electrode layer mainly made of activated carbon is formed on a collector made of aluminum foil, and a negative electrode in which a polarized electrode layer mainly made of carbon material is formed on a collector made of copper foil. This element is impregnated with an organic electrolyte containing lithium ions.

As described above, disclosed capacitors and capacitor modules using these capacitors can be used for charging and discharging of a large current, and have a large power density. Accordingly, these capacitors and capacitor modules are effectively applicable, in particular, to vehicles including hybrid vehicles.

What is claimed is:

1. A capacitor comprising:
   a capacitor element having:
      a first electrode including:
         a sheet-like first collector;
         a first electrode layer formed on a surface of the first collector; and
         a first lead connected to the first collector,
      a second electrode facing the first electrode and including:
         a sheet-like second collector;
         a second electrode layer formed on a surface of the second collector; and
         a second lead connected to the second collector, and
      a separator disposed between the first electrode and the second electrode,
      the capacitor element being configured as a wound capacitor element with the first electrode, the second electrode, and the separator wound around a winding axis, and having a first end and a second end on an opposite side of the first end in a direction along the winding axis;
   an electrolyte with which the capacitor element is impregnated; and
   an exterior housing accommodating the capacitor element and the electrolyte, and allowing a part of each of the first and second leads to pass through the exterior housing;
   wherein at least one of following first case (i) and second case (ii) is satisfied:
   (i) the first collector has a first exposed part exposed from the first electrode layer at the first end,
      a part of the first exposed part is bent to form a first bend portion along a radial direction of the wound capacitor element,
      at least two points of the first exposed part are electrically connected together at the first bend portion,
      the first exposed part configures, at the first end of the capacitor element, a capacitor element first end face that is perpendicular to the winding axis, and
      at least one first welding mark where the first bend portion is electrically connected is formed on the capacitor element first end face in the radial direction of the wound capacitor element; and
   (ii) the second collector has a second exposed part exposed from the second electrode layer at the second end,
      a part of the second exposed part is bent to form a second bend portion along a radial direction of the wound capacitor element,
      at least two points of the second exposed part are electrically connected together at the second bend portion,
      the second exposed part configures, at the second end of the capacitor element, a capacitor element second end face that is perpendicular to the winding axis, and
      at least one second welding mark where the second bend portion is electrically connected is formed on the capacitor element second end face in the radial direction of the wound capacitor element.

2. The capacitor according to claim 1, wherein
   in the first case (i), the first bend portion is formed in a direction away from the winding axis of the capacitor element; and
   in the second case (ii), the second bend portion is formed in a direction away from the winding axis of the capacitor element.

3. The capacitor according to claim 1, wherein
   in the first case (i), an area of the first bend part is smaller than an area of the first end face subtracting the area of the first bend part, and
   in the second case (ii), an area of the second bend part is smaller than an area of the second end face subtracting the area of the second bend part.

4. The capacitor according to claim 1, wherein
   in the first case (i), a power-collection auxiliary member formed of a conductive material is provided and electrically connected to the first exposed part at two or more points; and
   in the second case (ii), a power-collection auxiliary member formed of a conductive material is provided and electrically connected to the second exposed part at two or more points.

5. The capacitor according to claim 1, wherein
   in the first case (i), the first lead is in contact with the first exposed part, and
   in the second case (ii), the second lead is in contact with the second exposed part.

6. The capacitor according to claim 5, wherein
   in the first case (i), the first lead includes an electrode connector connected to the first electrode and an externally-protruded part electrically connected to the electrode connector and protruding outside the exterior housing, the electrode connector includes a first electrode connector connected to the first collector at a point other than the first exposed part, and a second electrode connector connected to the first electrode connector and the first exposed part; and
   in the second case (ii), the second lead has an electrode connector connected to the second electrode and an externally-protruded part electrically connected to the electrode connector and protruding outside the exterior housing, the electrode connector includes a first electrode connector connected to the second collector at a point other than the second exposed part, and a second electrode connector connected to the first electrode connector and the second exposed part.

7. The capacitor according to claim 6,
wherein a bend part is formed at a connecting portion of the second electrode connector and the first electrode connector.

8. The capacitor according to claim 1, wherein
in the first case (i), the first lead has an edge parallel to an edge of the first exposed part, and the edge of the first lead is welded and bonded together with the first exposed part, and
in the second case (ii), the second lead has an edge parallel to an edge of the second exposed part, and the edge of the second lead is welded and bonded together with the second exposed part.

9. The capacitor according to claim 1,
wherein the first lead and the second lead protrude from the first end of the capacitor element, and a portion of the second lead in contact or facing the first exposed part is insulated from the first exposed part.

10. The capacitor according to claim 1, further comprising an insulator disposed between an inner bottom face of the exterior housing and the capacitor element.

11. A capacitor module comprising:
a plurality of the capacitors each according to claim 1; and
a wiring member electrically connecting the plurality of the capacitors.

* * * * *